(No Model.) 3 Sheets—Sheet 1.

E. HILL.
VALVE GEAR FOR STEAM ENGINES.

No. 510,685. Patented Dec. 12, 1893.

(No Model.) 3 Sheets—Sheet 2.

E. HILL.
VALVE GEAR FOR STEAM ENGINES.

No. 510,685. Patented Dec. 12, 1893.

Witnesses
J. N. Shumway
L. D. Kelsey

Ebenezer Hill
Inventor
By Atty
Earle Seymour

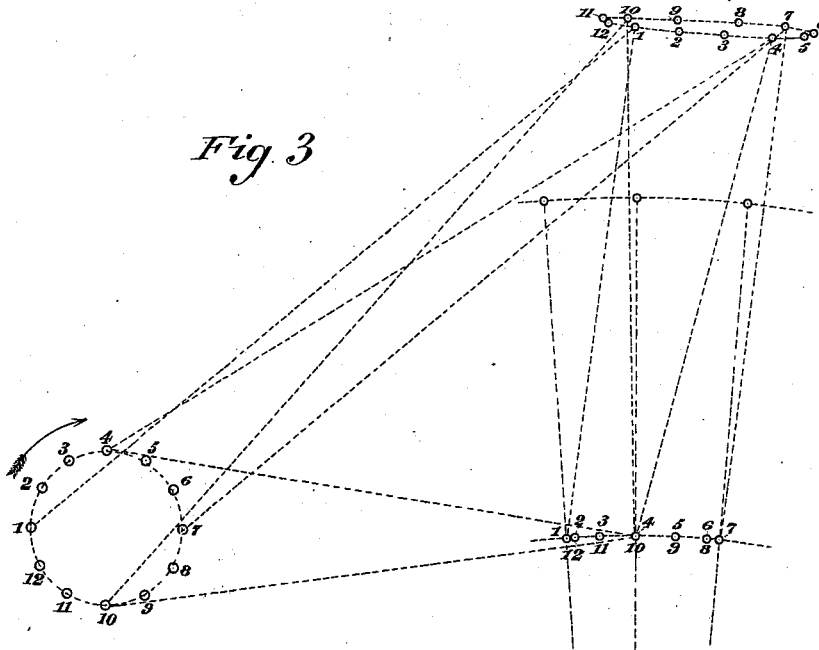

UNITED STATES PATENT OFFICE.

EBENEZER HILL, OF SOUTH NORWALK, CONNECTICUT.

VALVE-GEAR FOR STEAM-ENGINES.

SPECIFICATION forming part of Letters Patent No. 510,685, dated December 12, 1893.

Application filed November 21, 1890. Serial No. 372,131. (No model.)

*To all whom it may concern:*

Be it known that I, EBENEZER HILL, of South Norwalk, in the county of Fairfield and State of Connecticut, have invented a new Improvements in Valve-Gear for Steam-Engines; and I do hereby declare the following, when taken in connection with accompanying drawings and the letters of reference marked thereon, to be a full, clear, and exact description of the same, and which said drawings constitute part of this specification, and represent, in—

Figure 1:
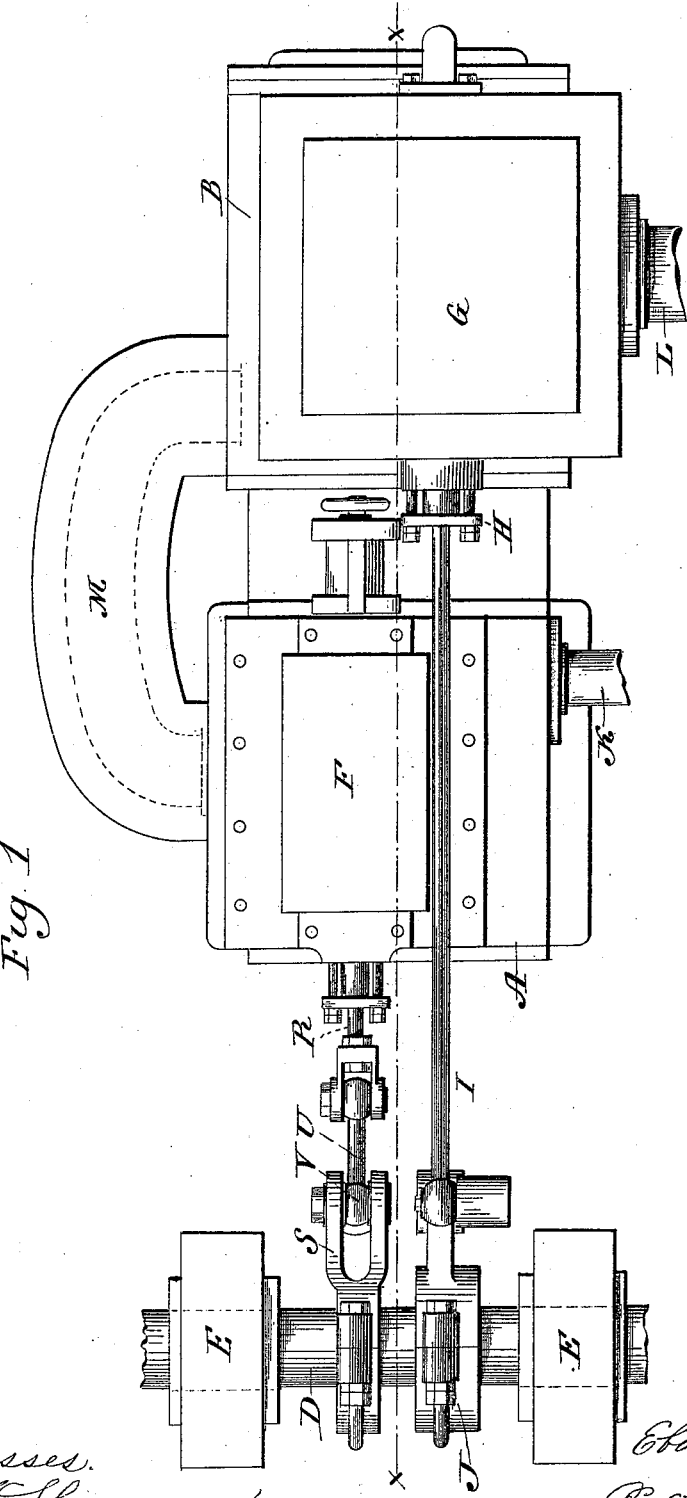
Figure 2:
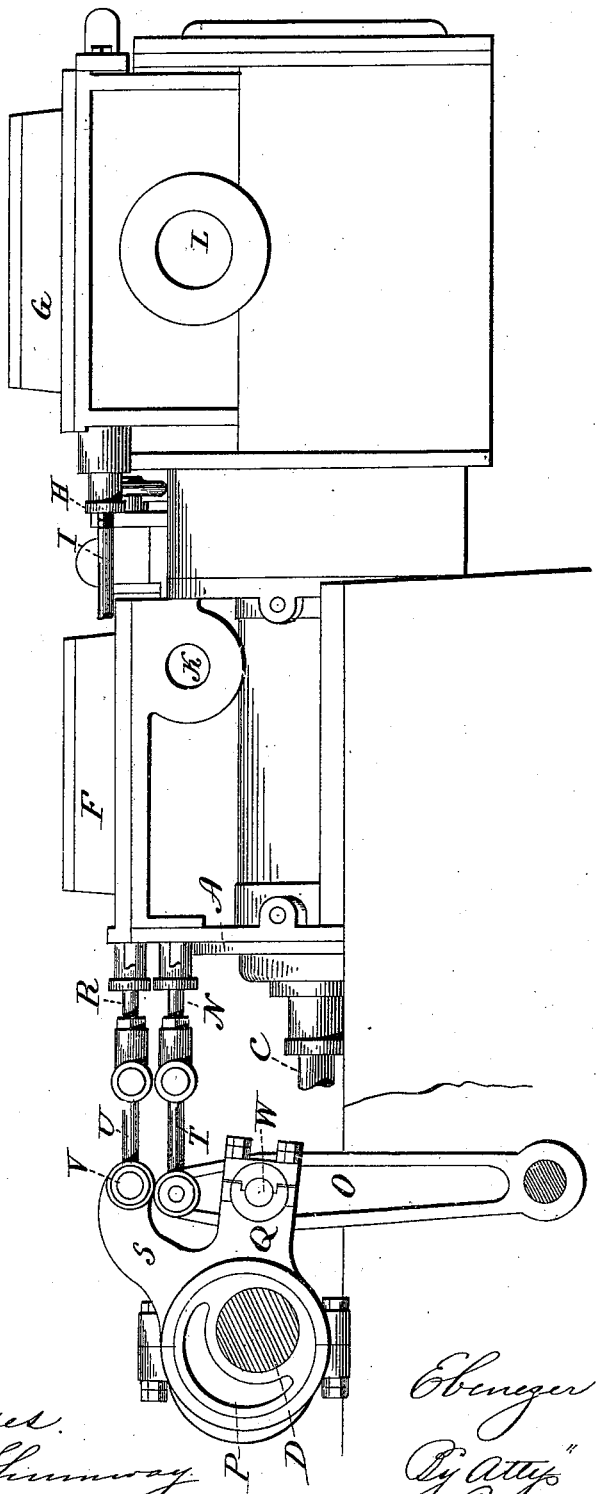

Figure 1, a plan view showing the invention as applied to a compound engine, only so much of the engine being shown as is required for the illustration of the invention; Fig. 2, a side view of the same, in partial section; Fig. 3, a diagram illustrating the operation of the valve mechanism.

This invention relates to an improvement in valve-gear for steam-engines, and has for its object an improvement in connections for operating the valves.

A, represents the high-pressure cylinder, and B, the low-pressure cylinder, arranged in direct longitudinal line with each other.

C, represents the piston-rod, as seen in Fig. 2, which is in central line with and so as to work through both cylinders, as usual in this class of engines. The piston-rod extends to the cross-head, in the usual manner, those connections not shown, as they are immaterial to the invention.

D, represents the main shaft, which as usual in this class of engines, is arranged in bearings E E between the main-cylinder and the cross-head, and to the outer ends of which crank-shafts are applied, and connections made with the cross-heads. These crosshead connections are not illustrated, as they are immaterial to the invention.

F, represents the steam-chest of the high-pressure cylinder, and G, represents the steam-chest of the low-pressure cylinder, and the broken line *x—x* represents the central line of the two cylinders. The steam-chest F, of the high pressure cylinder, is arranged so far to one side of said central line, and the steam chest G of the low-pressure cylinder so far to the opposite side of the same central line, as to leave a direct clear space from the valve rod stuffing-box H of the steam-chest G, toward the main-shaft, and so that the valve-rod I, of the low-pressure cylinder G, may work over the high-pressure cylinder at one side of the steam-chest F, said rod I, being connected to its eccentric J on the main-shaft in a well known manner.

K, represents the steam-inlet for the high-pressure cylinder F, and L, represents the exhaust from the low-pressure cylinder.

M, represents the connection from the exhaust of the high-pressure cylinder to the inlet of the low-pressure cylinder. This is substantially the usual connection.

N, represents the valve-rod for operating the principal valve of the high-pressure cylinder, and is connected to a rocker-arm O, which is operated by an eccentric P, on the main shaft D, the strap of said eccentric having an arm Q extending radially therefrom, and hung to the rocker-arm O.

R, represents the valve-rod of the cut-off valve of the high-pressure cylinder, and it is connected to a second arm S, extending from the strap of the same eccentric P. The valve-rod N, is connected to the upper end of the rocker-arm O, by a link T, and the valve R, is connected to the arm S, by a similar link U. The eccentric P, is set with the proper angular advance and throw, and in that regard does not differ from the general practice of setting similar eccentrics. The valves are not shown, they being any of the common and well known constructions of main and cut-off valves arranged so as to slide with their respective rods.

It is well known that to attain the best results in a cut-off valve, its movement must differ materially as to angular advance from the movement of the main valve eccentric. The extent of its movement may be less, but generally a greater extent of movement is required for the cut-off valve than what is desirable for the main-valve. It is evident that the main valve will be moved directly backward and forward under the simple vibratory movement of the rocker-arm O. The movement of the arm S, is, however, qualified by the combined operation of the eccentric on the main-shaft and the connection Q with the rocker-arm, the movement of the connection Q, being substantially in a direct forward and back line, while the eccentric P describes a circle around the axis of the main shaft imparting a corresponding movement to the eccentric strap. This oscillatory movement of the eccentric strap produced by the rotative movement of the eccentric, imparts to the arm S, not only a forward and back movement, due to the longitudinal throw of the eccentric, but also a movement due to the up and down movement produced in the rotation of the eccentric; this up and down movement by the throw of the eccentric will produce a longitudinal vibratory motion of the arm S from the center of the connection between the eccentric and the rocker-arm O. While this arrangement somewhat resembles what is known as the "Fink link motion," it is yet materially different. The point of connection V, between the arm S, and the link U, has a considerably greater movement than the point of connection W, between the eccentric and the rocker-arm O, and the said point V moves with a time materially different from that of the point W. This is illustrated in the diagram Fig. 3.

The circle $a$, represents the circle traveled by the eccentric around the center $b$, of the main-shaft. The point 1, in that circle represents the beginning of the throw of the eccentric. The line $c$, represents the central line of the rocker-arm in the position of commencing its forward movement corresponding to the point 1 in the circle $a$, and the point 1 above, indicates the point of connection between the arm S, and its link at the same time.

I have represented the revolution of the eccentric as divided into twelve parts, and the movements of the rocker-arm and of the arm S, are correspondingly divided in the diagram. As the eccentric passes to the position 2, the rocker-arm has moved to a corresponding position, and the eccentric arm S, will have carried its point of connection to a corresponding position 2, and so on. Point 3 of the eccentric circle will have brought the corresponding point of the rocker-arm to the position 3, and the arm S, will have passed on to the position 3. At the quarter point 4 the positions will be as indicated by 4. During the movement to this point, 4, the connecting point of the arm S, has been moving rapidly forward, while the rocker-arm has moved slowly. Now the rocker-arm commences a rapid forward movement, the positions 5 and 6 indicating the corresponding two advance steps of the rocker-arm and two corresponding steps of the arm S, but the movement of the arm S, between the points 5 and 6, is an extremely slight advance. From this point 6 in the rotation of the eccentric to the forward extreme throw of the eccentric, indicated by the point 7, the rocker-arm advances accordingly to its extreme forward point, but the arm S, owing to the oscillating movement imparted to it by the eccentric, now retreats, and reaches its point 7 on the return, before the rocker-arm has reached its extreme forward movement, and so continuing, on the return through the steps 8, and 10, which point 10 has brought the eccentric arm S, back to substantially the place of beginning, as indicated by 10 in the diagram; continuing to the points 11 and 12 the eccentric arm still retreats but between the points 11 and 12, its movement is substantially nothing. From the point 12 to the place of beginning of the eccentric, that is to the point 1, the rocker-arm substantially stands at rest, but the eccentric arm S advances from the point 12, to the place of beginning. Thus it will be seen that the eccentric arm S, commences its retreat before the rocker-arm reaches its extreme forward movement, and commences its advance before the rocker-arm reaches its extreme rear movement.

The diagram Fig. 3 and its description refer to running in the direction indicated by the arrow. It will be obvious that whereas running in this direction the cut-off valve will have reached the end of its course and have started on its return before the steam-valve reaches its limit of movement, if running in the opposite direction the steam-valve will reach the limit in advance of the cut off valve; either movement is appropriate for a cut-off valve according as the cut-off is effected by the outside or inside edge of the valve. By this construction the two arms of the eccentric are arranged in the same plane one above the other, and in the plane of the eccentric, so that all the movements are produced in direct lines.

I have stated that the movement of the arm S, at its point of connection with the cut-off valve resembles the movement of a point on a Fink link, but it is well known to those skilled in the art that the adjustment of a Fink link is a delicate operation, and not understood by an ordinary engineer, whereas by my invention the only adjustment to be noted by the engineer is the common adjustment of the eccentric P, substantially the same as in the adjustment for a common slide valve.

By the employment of a rocker-arm, as described, I am enabled to greatly magnify the action of the eccentric on the main valve, and also to operate the valves at any desired distances from the line of travel of the eccentric.

I am aware that it is old to actuate the main-valve and the cut-off valve of a steam-engine by valve-rods connecting with a single eccentric, and I do not therefore claim that construction broadly, but only my particular construction, which comprises a rocker-arm which is interposed between the eccentric and the main-valve rod.

I claim—

In a steam-engine, the combination with the main-shaft and the steam-chest thereof, of a main-valve and a cut-off valve moving in planes parallel with the axis of the said main shaft, an eccentric mounted on the said shaft, an eccentric strap applied to the said eccentric and constructed with two arms located one above the other, a rod connecting the cut-off valve with the upper arm of the eccentric strap, a rocker-arm located in a vertical plane, hung by its lower end, attached between its ends to the lower arm of the strap, and having its projecting upper end extended under the upper arm of the strap, and a rod connecting the main-valve with the projecting upper end of the said rocker-arm, which is interposed between the eccentric and the main valve-rod, substantially as described, and whereby the action of the eccentric on the main rod is magnified by means of the rocker-arm, and whereby also the valves may be operated at desired distances from the line of travel of the eccentric.

In testimony whereof I have signed this specification in the presence of two subscribing witnesses.

EBENEZER HILL.

Witnesses:
HENRY P. PRICE,
ALFRED W. BETTS.